United States Patent
Pai

[19]

[11] Patent Number: 5,474,195
[45] Date of Patent: Dec. 12, 1995

[54] BUILT-UP BASKET

[76] Inventor: Ming Y. Pai, No. 26-5, Chuan Chou Rd., Shen Kang Hsiang, Chang Hua Hsien, Taiwan

[21] Appl. No.: 377,877

[22] Filed: Jan. 24, 1995

[51] Int. Cl.$^6$ ................................... B65D 8/14
[52] U.S. Cl. ............................................ 220/4.26
[58] Field of Search ................ 220/4.01, 4.03, 220/4.28, 4.26, 4.27, 666, 691

[56] References Cited

U.S. PATENT DOCUMENTS

| | | | |
|---|---|---|---|
| 315,917 | 4/1885 | Dean | 220/4.26 |
| 537,182 | 4/1895 | Brown | 220/4.26 |
| 3,208,620 | 9/1965 | Herdering | 220/4.26 |
| 3,506,152 | 4/1970 | Stollman | 220/4.26 |
| 4,203,525 | 5/1980 | Okubo | 220/4.26 |
| 4,212,415 | 7/1980 | Neely | 220/4.26 |
| 4,460,214 | 7/1984 | Kuhns | 220/4.03 |
| 5,339,974 | 8/1994 | Raghunathan | 220/4.26 |

FOREIGN PATENT DOCUMENTS

| | | | |
|---|---|---|---|
| 945139 | 6/1956 | Germany | 220/4.26 |

*Primary Examiner*—Stephen J. Castellano
*Attorney, Agent, or Firm*—Pro-Techtor International

[57] ABSTRACT

A built-up basket including a base plate, and a series of basket rings of different outer diameters connected to the base plate in a stack defining a top-open chamber for carrying things, the outer diameters of the basket rings and the base plate respectively reducing from the top side toward the bottom side, the basket rings and the base plate having a respective outward top flange, the basket rings and the base plate having a plurality of plug holes on the respective outward top flange, the basket rings having a plurality of bottom plug rods respectively fitted into the plug holes on one another and on the base plate.

5 Claims, 4 Drawing Sheets

BUILT-UP BASKET

BACKGROUND OF THE INVENTION

The present invention relates to baskets for bicycles, and relates more particularly to a built-up basket which can be disassembled and arranged in a collapsed condition to reduce space occupation during its delivery.

Regular baskets (luggage carriers) for bicycles are commonly made by welding iron rods into bare baskets, and then coating the bare baskets with a layer of plastic covering by dipping them in liquid plastics. This basket fabrication process has drawbacks as outlined herein after.

i) Because the basket is made by welding iron rods into shape and then coating the bare basket with a layer of plastic covering, the complicated fabrication procedure greatly increases the cost of the basket;

ii) Because the basket is made by welding iron rods into shape, it is not collapsible and occupies much storage space during its delivery;

iii) The welding quality of the basket is difficult to control, and the structural strength of the basket will be affected if the iron rods are not properly welded together;

iv) The grillework of the basket is not suitable for carrying small items; and v) Because the plastic covering is formed by dipping the bare basket in liquid plastics, the basket can only be made in one color, therefore it is less attractive.

SUMMARY OF THE INVENTION

The present invention has been accomplished under the circumstances in view. It is one object of the present invention to provide a built-up basket which is inexpensive to manufacture. It is another object of the present invention to provide a built-up basket which can be collapsed and received with the parts thereof one inside another to reduce the storage space during its delivery. It is still another object of the present invention to provide a built-up basket which consists of parts of different colors. It is still another object of the present invention to provide a built-up basket which has no spaces on the periphery when assembled so that it is suitable for carrying articles of different sizes. It is still another object of the present invention to provide a built-up basket which has drain holes at the bottom for drainage of water.

According to the preferred embodiment of the present invention, the built-up basket is comprised of a base plate, and a series of tapered basket rings arranged in a stack by fitting respective bottom plug rods into respective top plug holes and then fastened to the base plate by plug joints. The base plate and the tapered basket rings have mounting holes for fastening to the frame of a bicycle by fastening elements. The base plate has drain holes for drainage of water. When the base plate and the basket rings are disconnected from one another by disconnecting the respective plug rods from the respective plug holes, they can be received one inside another to reduce space occupation.

DETAILED DESCRIPTION OF THE PREFERRED EMBODIMENT

Figure 1:
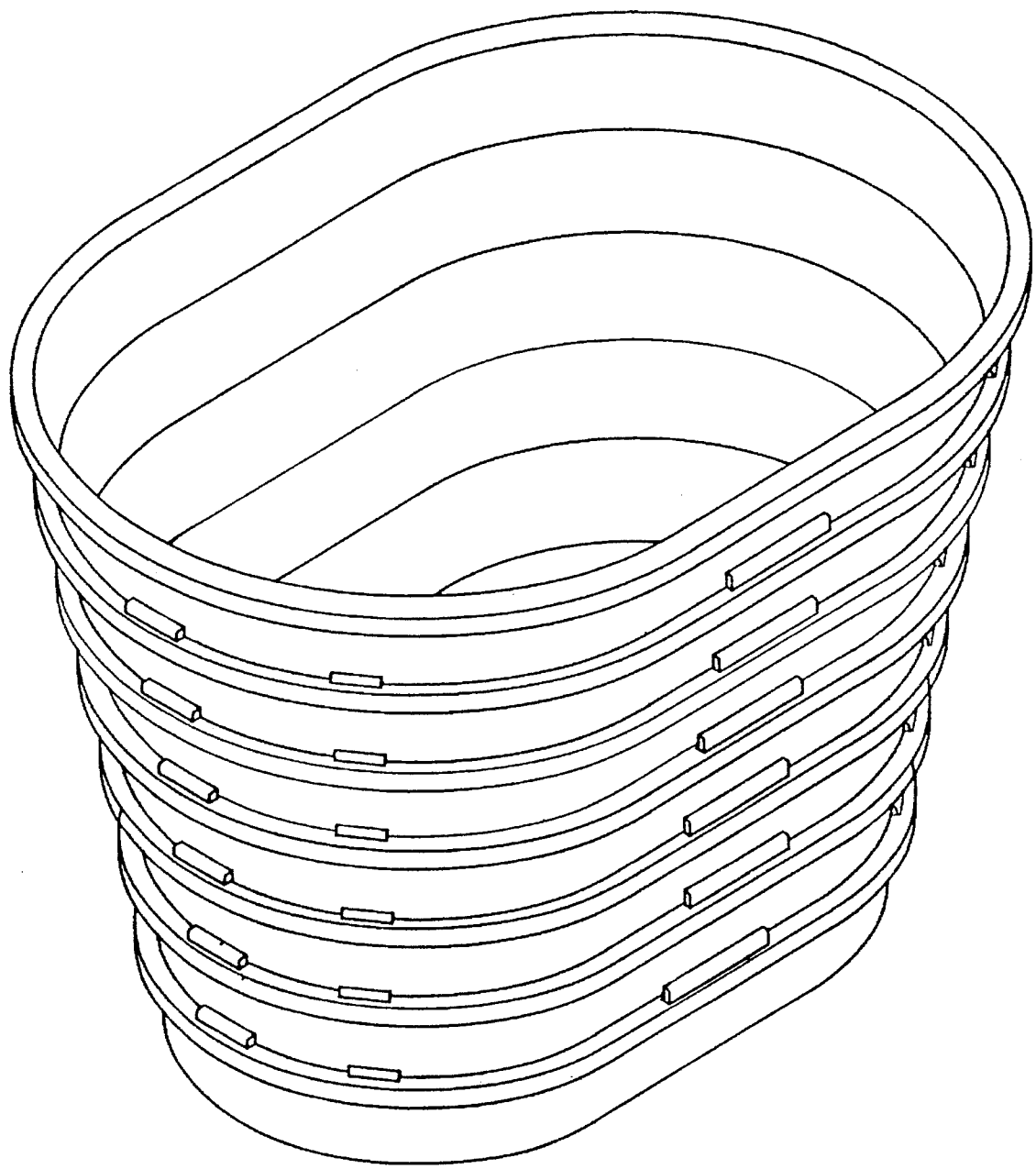
FIG. 1 is an elevational view of a built-up basket according to the present invention.
Figure 2:
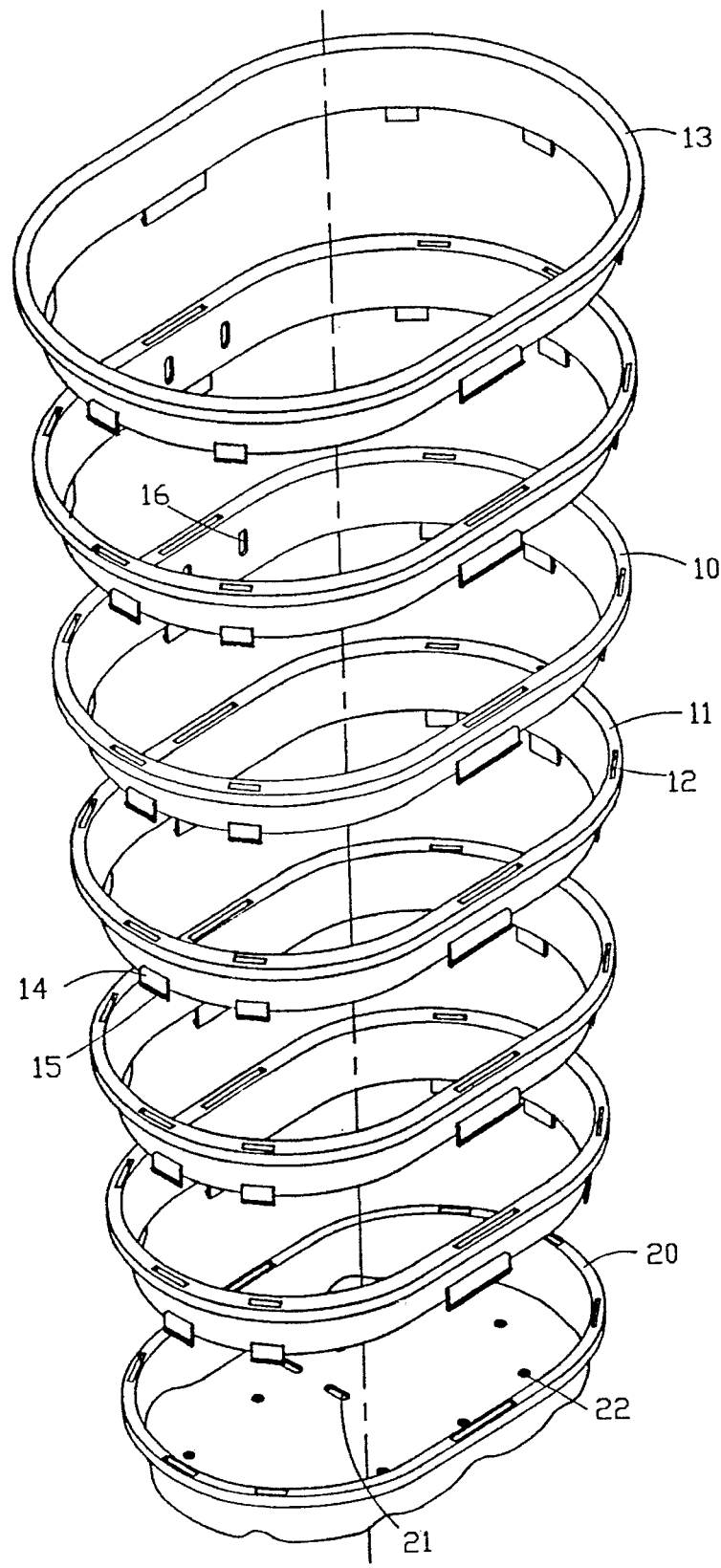
FIG. 2 is an exploded view of the built-up basket shown in FIG. 1.
Figure 3:
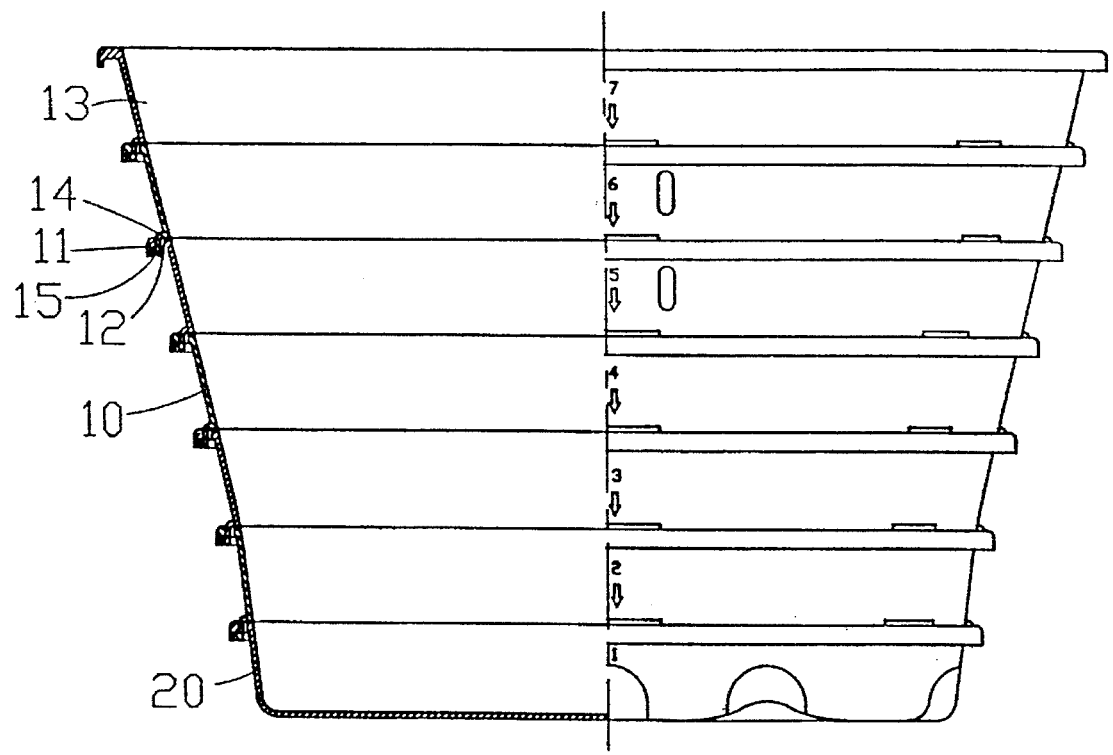
FIG. 3 is a side elevation in section of the built-up basket shown in FIG. 1.

Referring to Figures from 1 to 3, a built-up basket in accordance with the present invention is generally comprised of a series of intermediate basket rings 10, a top basket ring 13, and a base plate 20. The basket rings 10 and 13 and the base plate 20 are respectively molded from plastics of different colors. The basket rings 10 and 13 are fastened to the base plate 20 in a stack, defining an open space for carrying things ( see FIG. 1). The outer diameter of each basket ring 10 or 13 reduces gradually from the top side toward the bottom side. The basket rings 10 and 13 are of different sizes such that the outer diameter of the bottom side of one basket ring fits the outer diameter of the top side of another. The base plate 20 and the basket rings 10 and 13 each has an outward top flange 11. A plurality of plug holes 12 are respectively made on the outward top flanges 11 of the base plate 20 and the intermediate basket rings 10. The basket rings 10 and 13 each has a plurality of bottom plug rods 15 respectively terminating in a hooked end 15. By fitting the respective bottom plug rods 15 into the respective plug holes 12, the basket rings 10 and 13 and the base plate 20 are fastened together. When assembled, the hooked ends 15 of the bottom plug rods 15 are respectively hooked on the inside of the plug holes 12, and therefore the basket rings 10 and 13 and the base plate 20 do not disconnect from one another. However, by pulling the basket rings 10 and 13 from one another and from the base plate 20 by force, the assembled basket can be easily disassembled. Furthermore, a plurality of mounting holes 16 and 21 are respectively made on the intermediate basket rings 10 and the base plate 20 at suitable locations, by which the assembled basket can be fastened to the frame of a bicycle by fastening elements; a plurality of drain holes 22 are made on the base plate 20 for drainage of water.

Figure 4:
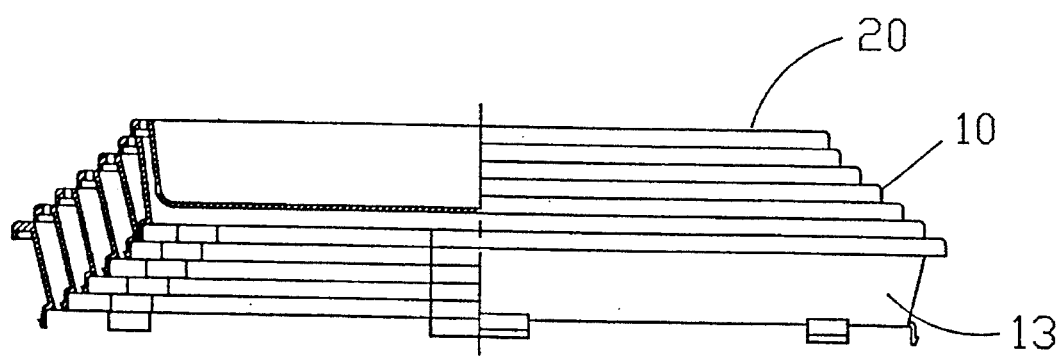
FIG. 4 shows the built-up basket of FIG. 1 collapsed and received one inside another.

Referring to FIG. 4, when the basket is disassembled, the basket rings 10 and 13 and the base plate 20 can be received on inside another.

While only one embodiment of the present invention has been shown and described, it will be understood that various modifications and changes could be made without departing from the spirit and scope of the invention.

What is claimed is:

1. A built-up basket comprising a base plate, and a plurality of basket rings connected to said base plate in a stack, said basket rings including a top basket ring and a series of intermediate-basket rings connected between said base plate and said top basket ring, said top and intermediate basket rings having a respective outer diameter reducing from a respective top side toward a respective bottom side, the outer diameter of the top side of one basket ring fitting the outer diameter of the bottom side of another, said basket rings and said base plate having a respective outward top flange projected from the respective top side, the outward top flanges of said base plate and said intermediate basket rings each having a plurality of plug holes, said top and intermediate basket rings each having a plurality of bottom plug rods respectively fitted into said plug holes.

2. The built-up basket of claim 1 wherein said bottom plug rods are terminated in a respective hooked end.

3. The built-up basket of claim 1 wherein said base plate and said basket rings each has a plurality of mounting holes for fastening to the frame of a bicycle by fastening elements.

4. The built-up basket of claim 1 wherein said base plate has a plurality of drain holes for drainage of water.

5. The built-up basket of claim 1 wherein said basket rings can be detached from one another and from said base plate by disconnecting said bottom plug rods from said plug holes, and then received with said base plate one inside another.

* * * * *